United States Patent [19]

Brown et al.

[11] Patent Number: 5,746,022
[45] Date of Patent: May 5, 1998

[54] COATED SEED HAVING IMPROVED COLORANT

[75] Inventors: Steven E. Brown, Spartanburg, S.C.; Bruce H. Suddeth, Columbus, N.C.

[73] Assignee: Milliken Research Corporation, Spartanburg, S.C.

[21] Appl. No.: 600,619

[22] Filed: Feb. 13, 1996

[51] Int. Cl.$^6$ .................... A01C 1/06; A01C 1/00
[52] U.S. Cl. ............. 47/57.6; 47/DIG. 9; 427/4; 504/100
[58] Field of Search ............ 47/57.6, 58, DIG. 9; 8/506; 427/4; 504/100

[56] References Cited

U.S. PATENT DOCUMENTS

| | | | |
|---|---|---|---|
| 3,157,633 | 11/1964 | Kuhn | 260/200 |
| 4,167,510 | 9/1979 | Brendle | 260/174 |
| 4,272,417 | 6/1981 | Barke et al. | 260/22 R |
| 4,284,729 | 8/1981 | Cross et al. | 521/158 |
| 4,640,690 | 2/1987 | Baumgartner et al. | 8/506 |
| 4,665,648 | 5/1987 | Branco | 47/57.6 |
| 4,735,015 | 4/1988 | Schmolka | 47/57.6 |
| 5,087,475 | 2/1992 | Bazin et al. | 427/4 |
| 5,248,516 | 9/1993 | Wheatley et al. | 427/3 |
| 5,300,127 | 4/1994 | Williams | 47/57.6 |
| 5,387,745 | 2/1995 | Brendle | 504/116 |
| 5,389,399 | 2/1995 | Bazih et al. | 427/212 |

FOREIGN PATENT DOCUMENTS

| | | | |
|---|---|---|---|
| 93/01705 | 2/1993 | WIPO | A01C 1/08 |
| 94/10285 | 11/1994 | WIPO | C11D 3/40 |

OTHER PUBLICATIONS

Aldrich Catalog Handbook of Fine Chemicals, Aldrich Chemical Company, Milwaukee, WI, p. 1227, 1996.
Encyclopedia of Polymer Science and Engineering. Ed.: Mark et al. John Wiley and Sons, New York. pp. 772–780, 1985.
The Merck Index. Ed.:Budavari et al. Eleventh Edition. Merck and Co., Inc. Rahway. NJ. pp. 709 and 2492, 1989.
Polymeric Materials Encyclopedia. Ed.: Salamone. CRC Press, Boca Raton. vol. 3. pp. 2075–6, 1996.

*Primary Examiner*—Douglas W. Robinson
*Assistant Examiner*—Melissa L. Kimball
*Attorney, Agent, or Firm*—Terry T. Moyer; Timothy J. Monahan

[57] ABSTRACT

An improved coated seed is provided by incorporating a poly(oxyalkylene) substituted organic chromophore in the coating.

14 Claims, No Drawings

COATED SEED HAVING IMPROVED COLORANT

BACKGROUND OF THE INVENTION

This invention relates generally to coatings for seeds, and in particular to coatings incorporating a poly(oxyalkylene) substituted colorant.

Seeds may be provided with a coating for a number of reasons. Coatings provide protection against abrasion during shipping, storage and broadcasting of seeds, which can otherwise damage the seeds and reduce their viability. Some seeds are very small or irregular and the coating increases the size of the seed to make broadcasting easier and improve flowability.

The coating can seal cracks or defects in the hull or surface of the seeds, to prevent the entry of moisture, mold or bacteria, which can reduce the germination rate or cause the seed to spoil. Trace elements and nutrients can be incorporated into the coating and made available for sprouting seeds. Additionally, protective agricultural chemicals, such as fungicides, herbicides and pesticides may also be included in the coating. Thus, the coating may serve to increase the survival rate and health of young plants.

Additionally, a coloring agent is often provided in a coating composition or applied by itself to the outer surface of the seed. Coloring agents provide product differentiation between sellers, identification of grade and variety, camouflage against birds and other predators once the seeds have been broadcast, means to visibly identify seed placement, and, in conjunction with a coating composition containing other components, a quality control check for coating coverage.

Many dyes and pigments have been approved and are being used to coat seeds: FD& C Blue #1; FD&C Red #40; D&C Green #6; D&C Red #17; D&C Violet #2; D&C Red #33; Rhodamine B; Tartrazine; Methylene Blue; Methyl Violet 2B; Pigment Red 481; Pigment Blue 15; Pigment Green 7; and Pigment Violet 23. The list includes both water and oil soluble coloring agents.

An important consideration in providing coatings for seeds, is the friability of the coating and dusting associated with handling, which can be especially hazardous when the coating includes a pesticide. A plasticizer may be necessary in the coating composition to improve the flexibility of the coating and reduce dusting.

Another shortcoming of the prior art coatings, is that some of the coloring agents are not compatible with a water based coating system or are only sparingly soluble in water. Since it is desirable to employ an aqueous coating composition for ease of manufacturing and to minimize emissions of organic solvents, the choice of available colorants is limited. If a dye is only sparingly soluble in water, it may be necessary to provide the dye in a dilute aqueous solution. Consequently, the time necessary to drive off excess water when the coating is cured, may lead to increased cycle time. Finally, many of the prior art colorants tend to stain equipment, containers, clothing and persons; which come in contact with the seeds.

Poly(oxyalkylene) substituted colorants are disclosed for use as fugitive tints for textiles (Kuhn, U.S. Pat. No. 3,157,633); colorants for thermosetting and thermoplastic resins (Cross et al. U.S. Pat. No. 4,284,729 and Baumgartner et al., U.S. Pat. No. 4,640,690); spray pattern indicators (Brendle U.S. Pat. No. 5,387,745); and as colorants for fabric softeners (WO 94/10285) and consumer products under the Liquitint® product line available from Milliken Chemical, Spartanburg, S.C.

SUMMARY OF THE INVENTION

Therefore, an object of the invention is to provide a seed having a color coating which is less prone to dusting. Another object of the invention is to provide a seed having a color coating which may be conveniently applied in an aqueous based coating process. Still another object is to provide a coated seed having a colorant which is water miscible or readily soluble in water to allow the reduction of water used in the coating process. Other objects of the invention are to provide a coated seed having a colorant with plasticizing characteristics; a seed having a color coating which is less friable; a color coated seed which is less staining; and a seed having an improved color coating which does not inhibit germination or other biological activity of the seed.

Accordingly, a seed having a color coating is provided wherein the colorant is selected from poly(oxyalkylene) substituted chromophores. The coating may also contain one or more of the following components: binders, biologically active agents, nutrients and soil conditioners and miscellaneous adjuvants.

The invention has the advantages of a coating with reduced dusting and friability; a colorant which also acts as a plasticizer for the coating; a more uniform and smooth coating; reduced drying times/increased production rates; better coating coverage; and a low toxicity, non-staining colorant.

Preferably, the invention has one or more of the following features:

the colorant has a minimum water solubility of 10 parts per 100 parts of water; and is preferably water miscible;

the neat colorant has a melting point of 100 degrees C or less; and the poly(oxyalkylene) substituent of the colorant contains at least 50 mole percent ethylene oxide residues and the balance of alkylene oxide are selected from ethylene oxide and propylene oxide residues.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. All of the United States patents cited in the specification are hereby incorporated by reference.

The present invention finds utility with virtually any type of plant seed. For example, seeds for commodity crops, fruits, vegetables, legumes, grasses and flowers may be coated according to the present invention.

For the reasons previously discussed, it is often desirable to coat the seeds with a colorant or colorant containing coating composition. Useful colorants may be characterized as organic chromophores having a poly(oxyalkylene) substituent. Any of a variety of chromophores may be employed, for example those organic chromophores classified as nitroso, nitro, azo, including monoazo, bisazo and polyazo, diphenylmethane, triarylmethane, xanthene, methine, acridine, thiazole, thiazine, indamine, indophenol, azine, oxazine, anthraquinone and phthalocyanine. Of particular interest are the azo, xanthene, triarylmethane, methine, anthraquinone and phthalocyanine chromophores.

The manufacture of these chromophores with one or more poly(oxyalkylene) substituents is disclosed in detail in the patents referenced herein, and is well known in the art. For example, the poly(oxyalkylene) substituent may be covalently bonded to the chromophore through an amino, oxy, sulfonamide, thio, sulfonyl, carbonyl or amido group. A number of poly(oxyalkylene) substituted chromophore are available from Milliken Chemical, a Division of Milliken & Company, Spartanburg, S.C.

The colorants of the present invention will generally constitute a chromophore having from 1 to 6 poly (oxyalkylene) substituents, usually from 1 to 4, made up primarily of ethylene oxide, propylene oxide or mixtures of ethylene oxide and propylene oxide residues. Minor amounts of glycidol and butylene oxide residues may be included, without deviating from the scope of the invention. The total number of alkylene oxide residues per colorant molecule ranges from 4 to 250, preferably 8 to 200, with 10 to 80 representing an optimum for fugitivity, viscosity and color strength.

The identity of the terminal group of the poly (oxyalkylene) substituent is not critical, but will have some influence on solubility of the colorant as disclosed in U.S. Pat. No. 4,167,510. By way of example, the terminal group may be hydroxy, amino, thio, or an acid ester group containing up to 20 carbon atoms.

The amount of colorant applied relative to the weight of the seed may vary greatly, depending on the particulars of the coating composition. By way of example, if the colorant is the only component of the coating, levels of 0.05 to 50 weight percent may be employed. Alternatively, the colorant may constitute only a fraction of the coating composition, and levels of 0.01 to 10 weight percent based on the weight of the seed may be employed to provide a homogeneous and uniform coating. The aforementioned use rates are directed to the poly(oxyalkylene) substituted chromophore. Those with skill in, the art will recognize that the coating composition may also include additional dyes or pigments, and that mixtures of such coloring agents are within the scope of the present invention.

In addition to the colorant, the coating composition may contain one or more of a binder, biologically active agent, which is intended to include biocides, nutrients and soil conditioners, and miscellaneous adjuvants, as is well known to those skilled in the art. The binder is a film forming or adhesive component capable of securing the coating composition to the surface of the seed, for example poly(vinyl alcohol), cellulosic polymers and derivatives, such as carboxymethylcellulose, hydroxyethylcellulose, poly (acrylic acid), polyacrylamide, poly (acrylamide/acrylic acid) copolymer, ethylene oxide/propylene oxide copolymers which are solid at 25° C., and water-soluble cellulose ether, vinyl acetate, low melting polyesters, such as poly-e-caprolactone, polymers and copolymers containing 2-propenenitrile or 2-methyl-2-propenenitrile, gelatin and lignosulfonates. Preferably, the binder is a water-soluble, film forming polymer.

The biologically active agent may be an agent selected to protect the seed from pests, fungi or birds, such as an antimicrobial agent, pesticide, fungicide or repellant. The nutrients and soil conditioning agents are selected to promote germination and/or growth, such as lime, trace elements, hormones, vitamins, fertilizer, and urea.

The miscellaneous adjuvants include wetting agents, surfactants, dispersing agents:, stabilizers, drying agents, such as aluminosilicates, opacifying agents, fillers, plasticizers and various compounds which are intended to enhance the performance of the binder such as ∝-cellulose, lactose and ethylene glycol.

The weight of coating relative to the weight of the seed may range from as low as, 0.05 weight percent, if only the colorant is employed, up to as high as 150% or more, such as for bermuda grass seed, or when one desires to increase the size of a small seed to improve its handleability. Typically, the coating will range from 0.1 to 3 weight percent based on the weight of the seed.

The coating composition may be applied to the seed by any number of techniques known to those skilled in the art of film coating. The process may be continuous or batch, and typically involves spraying a solution, dispersion and/or suspension of the coating composition on to the seeds, while they are tumbled, and then drying the coated seeds. It may be desirable to build up the seed coating gradually, by successive applications of the coating composition. Equipment designed specifically for such applications is available from Coating Machinery Systems, Inc.(CMS), Ames, Iowa.

Suitable processes for applying the coating to a seed include: Bazin et al., U.S. Pat. No. 5,389,399, applying the coating in a rotating drum; Williams, U.S. Pat. No. 5,300,127, slurring the seed and the coating; Bazin et al., U.S. Pat. No. 5,087,475, simultaneously spraying and drying a moving seed mass; Bridges et al., U.S. Pat. No. 5,248,516, freeze drying an aqueous coating composition; and Ciba Geigy AG, WO 9301705, applying the coating in the presence of a foaming agent.

Preferably, an aqueous based coating composition is employed. The colorant will generally be in solution, but the other components of the composition may be dissolved, dispersed or suspended depending on their solubility and particle size. In one embodiment of the invention, the aqueous based coating composition has the following formula:

from 5 to 80 parts biologically active agents;

from 20 to 45 parts water;

from 1 to 15 parts binder;

and from 0.1 to 50 parts colorant;

and up to 50 parts of miscellaneous adjuvants.

The invention may be further understood by reference to the following examples.

EXAMPLE I

The following example demonstrates the preparation of a green colorant composition, which is comprised of a yellow azo colorant and a blue triphenylmethane colorant, each of which is synthesized from a poly(oxyalkylene) substituted aniline intermediate.

Yellow Colorant Preparation

One mole (181 grams) of N,N-di(hydroxyethyl) aniline was placed in a flask equipped with a stirrer, thermometer and gas inlet tube near the bottom and a gas outlet tube near the top of the flask, and heated to 140° C. under nitrogen. About 200 mg. of sodium was added as catalyst. Ethylene oxide was bubbled into the molten, vigorously stirred material at a rate such that a slight amount of gas escaped from the outlet tube. The ethylene oxide addition was continued, with cooling to maintain the temperature between about 140°–160° C., until about 18 moles (792.9 g) of ethylene oxide was reacted, thus producing N,N-di (hydroxyethylpolyethyleneoxy)-aniline containing a total of about 20 ethyleneoxy groups.

Thirty grams (0.111 mole) of aniline-2,5 disulfonic acid were dissolved in 70 g of water, cooled to 5°–10° C. Sodium nitrite solution (which was produced by dissolving 9 lg, (0.13 moles) of sodium nitrite in 50 g of water) was added slowly. A pH of 2.5 or below was maintained with hydrochloric acid during sodium nitrite addition. One hundred and twenty-four grams (0.128 moles) of the N, N-di (hydroxyethylpolyethyleneoxy)-aniline compound was added slowly. After all the diazonium salt reacted (about 2 hours) the solution was made slightly alkaline with sodium hydroxide and sodium bicarbonate. A solution of a yellow colorant was obtained.

Blue Colorant Preparation

One mole (181 grams) of N,N-di(hydroxyethyl) aniline was placed equipped with a stirrer, thermometer and gas inlet tube near the bottom and a gas outlet tube near the top of the flask, and heated to 140° C. under nitrogen. About 200 mg. of sodium was added as catalyst. Ethylene oxide was bubbled into the molten, vigorously stirred material at a rate such that a slight amount of gas escaped from the outlet tube. The ethylene oxide addition was continued, with cooling to maintain the temperature between about 140°–160°C., until about 9 moles (396.5 g) of ethylene oxide was reacted, thus producing N,N-di(hydroxyethylpolyethyleneoxy)-aniline containing a total of about 10 ethyleneoxy groups.

A mixture of 500 g (0.534 mole) of the N,N-di (hydroxyethylpolyethyleneoxy)-aniline compound 50 g (0.240 moles) of o- formyl benzene sulfonic acid mono sodium salt and 50 g of hydrochloric acid with 10 grams urea was refluxed at a temperature of between 110°–120° C. for 6 hours. A mixture of 52 g (0.535 mole) of hydrogen peroxide and 52 g of water was added in one portion to the reaction mixture at 100°–105° C., whereupon the mixture was stirred an additional 30 minutes. The mixture as neutralized with sodium hydroxide and sodium bicarbonate. A solution of a blue colorant was obtained.

Green Colorant Composition

The yellow colorant and blue colorant were combined in a ratio of 60:40, by weight, respectively, and diluted with water to obtain an aqueous solution containing 37 weight percent colorant (solids) and 63 weight percent water.

EXAMPLE II

The following examples demonstrates an aqueous based, color coating composition and its application to a seed. A composition of 310 parts lime, 170 parts water, 30 parts of a poly(vinyl alcohol) binder and 1 part of the green colorant composition of Example 1 (37 weight percent solids) was applied to Giant Bermuda grass seeds in a conventional seed coating apparatus. The coating composition was sprayed into a heated cylindrical chamber while the seeds were being tumbled. The partially coated seeds were transferred to a series of three more cylindrical tumblers, where incremental coats of the composition were applied and dried.

The seeds were uniformally coated with a smooth green film. The average coating pickup was 100 weight percent, based on the weight of the uncoated seed.

EXAMPLE III (COMPARATIVE)

The following comparative example demonstrates use of a coating composition containing the prior art coloring agent.

Example II was repeated in all respects, except that the poly(oxyalkylene) substituted organic chromophore of Example I was replaced with a commercially available blue triphenylmethane dye and yellow/green acid dye blend, sold under the name PolyGreen™. The seeds were coated with a uniform green film, which upon visual inspection and analysis under a microscope ( 35X) was noticeably rougher and more irregular than the seeds of Example II.

EXAMPLE IV

The following example compares the dusting generated by the coated seeds of the present invention, Example II, and the comparative seeds of Example III, during simulated handling conditions.

A 500 ml, 3-neck flask, equipped with a Teflon® agitator blade, inlet and outlet stopcocks, and water aspirator, was charged with 20 grams of the coated seeds to be tested. The agitator was set at moderate agitation (160 rpm) as a stream of air was pulled across the tumbling seeds and through an in-line filter during a 10 minute period.

The dust generated was collected on the 5 micron filter and weighed. The sample containing coated seeds of the present invention (Example II) generated 0.267 grams of dust, whereas the prior art coated seed (Example III) was found to generate 0.527 grams of dust. Thus, the coated seed of the present invention achieved a 50% reduction in dusting.

There are, of course, many modifications and alternate embodiments of the invention, which are intended to be included within the scope of the following claims.

What we claim is:

1. In a seed having a color coating, an improvement comprising a poly(oxyalkylene) substituted organic chromophore incorporated in the coating.

2. The coated seed of claim 1, wherein the chromophore is selected from the group consisting of azo, xanthene, triarylmethene, methine, anthraquinone and phthalocyanine chromophores and the colorant has from 8 to 200 alkylene oxide residues per colorant molecule.

3. The coated seed of claim 2, wherein the colorant is coated on the seed at a level of from 0.01 to 50 weight % based on the weight of the seed.

4. The coated seed of claim 3, wherein the coating is present on the seed at a level of from 0.05 to 150 weight % based on the weight of the seed.

5. The coated seed of claim 2 wherein the colorant has a minimum water solubility of 10 parts per 100 parts of water.

6. The coated seed of claim 2 wherein the poly (oxyalkylene) substituent of the colorant contains at least 50 mole percent ethylene oxide residues and the balance of alkylene oxide residues are selected from ethylene oxide and propylene oxide residues.

7. A color coated seed obtainable by the process comprising the steps of spraying an aqueous composition on the seed, the composition having from 5 to 80 parts biologically active agents;
from 20 to 45 parts water;
from 1 to 15 parts binder;
from 0.01 to 50 parts of a poly(oxyalkylene) substituted organic chromophore; and
up to 50 parts miscellaneous adjuvants selected from the group consisting of wetting agents, surfactants, dispersing agents, stabilizers, drying agents, opacifying agents, fillers and plasticizers.

8. The coated seed of claim 7 wherein the chromophore is selected from the group consisting of azo, xanthene, triarylmethene, methine, anthraquinone and phthalocyanine chromophores and the colorant has from 8 to 200 alkylene oxide residues per colorant molecule.

9. The coated seed of claim 8, wherein the coating is present on the seed at a level of from 0.05 to 50 weight % based on the weight of the seed.

10. The coated seed of claim 9, wherein the binder is selected form the group consisting of poly(vinyl alcohol), carboxymethylcellulose, hydroxethylcellulose, poly (acrylic acid), poly acrylamide, gelatin and lignosulfonates.

11. The coated seed of claim 8 wherein the colorant has a minimum water solubility of 10 parts per 100 parts of water.

12. The coated seed of claim 8 wherein the poly (oxyalkylene) substituent of the colorant contains at least 50 mole percent ethylene oxide residues and the balance of alkylene oxide residues are selected from ethylene oxide and propylene oxide residues.

13. A coated seed comprising a poly(oxyalkylene) substituted organic chromophore incorporated in the coating, wherein the colorant has a minimum water solubility 10 parts per 100 parts of water.

14. The coated seed of claim 13, wherein the chromosphore is selected from the group consisting of azo, xanthene, triarylmethene, methine, anthraquinone and phthalocyanine chromophores and the colorant has from 8 to 200 alkylene oxide residues per colorant molecule.

* * * * *